US012254834B2

(12) United States Patent
Park

(10) Patent No.: US 12,254,834 B2
(45) Date of Patent: *Mar. 18, 2025

(54) DATA DRIVER AND DATA VOLTAGE SETTING METHOD THEREOF

(71) Applicant: SAMSUNG DISPLAY CO., LTD., Yongin-si (KR)

(72) Inventor: Jung Kook Park, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 161 days.

This patent is subject to a terminal disclaimer.

(21) Appl. No.: 17/732,258

(22) Filed: Apr. 28, 2022

(65) Prior Publication Data

US 2022/0254309 A1 Aug. 11, 2022

Related U.S. Application Data

(63) Continuation of application No. 16/932,656, filed on Jul. 17, 2020, now Pat. No. 11,335,268, which is a continuation of application No. 15/297,675, filed on Oct. 19, 2016, now Pat. No. 10,726,783.

(30) Foreign Application Priority Data

Oct. 20, 2015 (KR) ........................ 10-2015-0145995

(51) Int. Cl.
*G09G 3/3258* (2016.01)
*G09G 3/20* (2006.01)
(Continued)

(52) U.S. Cl.
CPC ............. *G09G 3/3258* (2013.01); *G09G 3/20* (2013.01); *G09G 3/2074* (2013.01);
(Continued)

(58) Field of Classification Search
None
See application file for complete search history.

(56) References Cited

U.S. PATENT DOCUMENTS 7,701,421 B2 4/2010 Ogura
8,749,540 B2 6/2014 Lee
(Continued)

FOREIGN PATENT DOCUMENTS

CN 101421772 A 4/2009
KR 10-1084172 B1 11/2011
(Continued)

OTHER PUBLICATIONS

European Search Report was issued from the European Patent Office on May 30, 2017 with respect to the European Patent Application No. 16194827. 8.
(Continued)

*Primary Examiner* — Andre L Matthews
(74) *Attorney, Agent, or Firm* — Womble Bond Dickinson (US) LLP

(57) ABSTRACT

A data driver includes a first and second data voltage generator and a third data voltage generator. The first and second data voltage generator generates a first data voltage corresponding to a first grayscale value and a second data voltage corresponding to a second grayscale value lower than the first grayscale value based on a reference voltage. The third data voltage generator generates a third data voltage corresponding to a third grayscale value lower than the second grayscale value based on a voltage level difference between the first data voltage and the second data voltage.

10 Claims, 7 Drawing Sheets

(51) Int. Cl.
*G09G 3/3233* (2016.01)
*G09G 3/3291* (2016.01)

(52) U.S. Cl.
CPC ......... *G09G 3/3233* (2013.01); *G09G 3/3291* (2013.01); *G09G 2300/0809* (2013.01); *G09G 2310/0275* (2013.01); *G09G 2310/0291* (2013.01); *G09G 2320/0233* (2013.01); *G09G 2320/0646* (2013.01)

(56) References Cited

U.S. PATENT DOCUMENTS

| | | | |
|---|---|---|---|
| 8,797,346 | B2 | 8/2014 | Park et al. |
| 8,982,164 | B2 | 3/2015 | Pyo |
| 2005/0088329 | A1 | 4/2005 | Tsuchi |
| 2008/0036708 | A1 | 2/2008 | Shirasaki et al. |
| 2012/0242710 | A1 | 9/2012 | Kang |
| 2016/0189635 | A1 | 6/2016 | Lee et al. |

FOREIGN PATENT DOCUMENTS

| | | | |
|---|---|---|---|
| KR | 10-2013-0051751 | A | 5/2013 |
| KR | 10-2015-0010807 | A | 1/2015 |

OTHER PUBLICATIONS

Extended European Search Report was issued from the European Patent Office on Oct. 2, 2017 with respect to the European Patent Application No. 16194827.8.

FIG. 6

| Classification | ΔV-1 | ΔV-2 | ΔV-3 |
|---|---|---|---|
| Vd-2 < Vdref1 | ΔV-11 | ΔV-21 | ΔV-31 |
| Vdref1 < Vd-2 < Vdref2 | ΔV-12 | ΔV-22 | ΔV-32 |
| Vdref2 < Vd-2 | ΔV-13 | ΔV-23 | ΔV-33 |

FIG. 7

| Classification | ΔV-1 | ΔV-2 | ΔV-3 |
|---|---|---|---|
| Vd-av < Vdref1 | ΔV-11' | ΔV-21' | ΔV-31' |
| Vdref1 < Vd-av < Vdref2 | ΔV-12' | ΔV-22' | ΔV-32' |
| Vdref2 < Vd-av | ΔV-13' | ΔV-23' | ΔV-33' |

DATA DRIVER AND DATA VOLTAGE SETTING METHOD THEREOF

CROSS-REFERENCE TO RELATED APPLICATIONS

This application is a continuation of U.S. patent application Ser. No. 16/932,656, filed Jul. 17, 2020, which is a continuation of U.S. patent application Ser. No. 15/297,675, filed Oct. 19, 2016, now U.S. Pat. No. 10,726,783, which claims priority to and the benefit of Korean Patent Application No. 10-2015-0145995, filed Oct. 20, 2015, the entire content of all of which is incorporated herein by reference.

BACKGROUND

1. Field

One or more embodiments described herein relate to a data driver and a method for setting a data voltage in a data driver.

2. Description of the Related Art

Various types of displays have been developed. Examples include liquid crystal displays, field emission displays, plasma display panels, and organic light emitting displays. Attempts have been made to enable a display device to emit light with a brightness level that corresponds to a desired grayscale value. However, existing techniques have drawbacks.

SUMMARY

In accordance with one or more embodiments, a data driver includes a first and second data voltage generator to generate a first data voltage corresponding to a first grayscale value and a second data voltage corresponding to a second grayscale value lower than the first grayscale value based on a reference voltage; and a third data voltage generator to generate a third data voltage corresponding to a third grayscale value lower than the second grayscale value based on a voltage level difference between the first data voltage and the second data voltage.

The third data voltage generator may include a first calculator to calculate the voltage level difference based on the first data voltage and the second data voltage from the first and second data voltage generator; a second calculator to calculate a voltage variation based on the voltage level difference from the first calculator; and a third calculator to calculate the third data voltage based on the voltage variation from the second calculator and the second data voltage from the first and second data voltage generator, wherein the third data voltage is based on one of a sum of or a difference between the second data voltage and the voltage variation.

The data driver may supply at least one of the first data voltage, the second data voltage, or the third data voltage to a display panel, the display panel includes a first pixel to emit light of a first wavelength, a second pixel to emit light of a second wavelength shorter than the first wavelength, and a third pixel to emit light of a third wavelength shorter than the second wavelength, each of the first and second data voltages includes a first sub data voltage corresponding to the first pixel, a second sub data voltage corresponding to the second pixel, and a third sub data voltage corresponding to the third pixel, the voltage level difference includes a first sub voltage level difference corresponding to the first pixel, a second sub voltage level difference corresponding to the second pixel, and a third voltage level difference corresponding to the third pixel, and the voltage variation includes a first sub voltage variation corresponding to the first pixel, a second sub voltage variation corresponding to the second pixel, and a third sub voltage variation corresponding to the third pixel.

The second calculator may store a first reference voltage level difference and a second reference voltage level difference greater than the first reference voltage level difference, and when the second sub voltage level difference is greater than the first reference voltage level difference and less than the second reference voltage level difference, each of a first sub voltage variation, second sub voltage variation, and third sub voltage variation is greater than each of a first sub voltage variation, a second sub voltage variation, and a third sub voltage variation when the second sub voltage level difference is less than the first reference voltage level difference, and is less than each of the first sub voltage variation, the second sub voltage variation, and the third sub voltage variation when the second sub voltage level difference is greater than the second reference voltage level difference.

The second calculator may store a first reference voltage level difference and a second reference voltage level difference greater than the first reference voltage level difference, and is to calculate an average voltage level difference based on the first sub voltage level difference to a third sub voltage level difference, and when the average voltage level difference is greater than the first reference voltage level difference and smaller than the second reference voltage level difference, each of the first sub voltage variation, the second sub voltage variation, and the third sub voltage variation is greater than each of the first sub voltage variation, the second sub voltage variation, and the third sub voltage variation when the average voltage level difference is less than the first reference voltage level difference, and is less than each of the first sub voltage variation to the third sub voltage variation when the average voltage level difference is greater than the second reference voltage level difference.

The first calculator may include a calculation amplifier and first, second, third, fourth and fifth resistors, the calculation amplifier including an inverting input terminal, a non-inverting input terminal, and an output terminal and a first end of the first resistor is electrically connected to the inverting input terminal, and the first data voltage is supplied to a second end of the first resistor, the second resistor is electrically connected between the inverting input terminal and the output terminal, a first end of the third resistor is electrically connected to the non-inverting input terminal and the second data voltage is supplied to a second end of the third resistor, the fourth resistor is electrically connected between the non-inverting input terminal and a ground, and the fifth resistor is electrically connected between the output terminal and ground.

The third calculator may include a calculation amplifier and sixth, seventh, eighth, ninth and tenth resistors, the calculation amplifier including an inverting input terminal, a non-inverting input terminal, and an output terminal, the sixth resistor is electrically connected between the inverting input terminal and a ground, the seventh resistor is electrically connected between the inverting input terminal and the output terminal, a first end of an eighth resistor is electrically connected to the non-inverting input terminal, and the second data voltage is supplied to a second end of the eighth resistor, a first end of the ninth resistor is electrically connected to the non-inverting input terminal, and the voltage variation is supplied to a second end of the ninth resistor, and the tenth resistor is electrically between the output terminal and ground.

In accordance with one or more other embodiments, a method for controlling a data driver includes correcting a first data voltage and a second data voltage corresponding a first grayscale value and a second grayscale value, respectively by optical measurement; and generating a third data voltage corresponding to a third grayscale value based on the first data voltage and the second data voltage, wherein the second grayscale value is lower than the first grayscale value and higher than the third grayscale value.

Generating the third data voltage may include calculating a difference between the first and second data voltages and generating a voltage level difference; generating a voltage variation based on a comparison of the voltage level difference with a first reference voltage level difference and a second reference voltage level difference; and generating the third data voltage by calculating a difference between the second data voltage and the voltage variation.

The method may include supplying the first data voltage to the third data voltage from the data driver to a display panel, the display panel including a first pixel to emit light of a first wavelength, a second pixel to emit light of a second wavelength shorter than the first wavelength, and a third pixel to emit light of a third wavelength shorter than the second wavelength, each of the first and second data voltages includes a first sub data voltage corresponding to the first pixel, a second sub data voltage corresponding to the second pixel, and a third sub data voltage corresponding to the third pixel, the voltage level difference includes a first sub voltage level difference corresponding to the first pixel, a second sub voltage level difference corresponding to the second pixel, and a third sub voltage level difference corresponding to the third pixel, and the voltage variation includes a first sub voltage variation corresponding to the first pixel, a second sub voltage variation corresponding to the second pixel, and a third sub voltage variation corresponding to the third pixel.

The second sub voltage level difference may be compared with a first reference voltage level difference and a second reference voltage level difference greater than the first reference voltage level difference, and when the second sub voltage level difference is greater than the first reference voltage level difference and smaller than the second reference voltage level, each of the first sub voltage variation, second sub voltage variation, and the third sub voltage is greater than each of the first sub voltage variation, second sub voltage variation, and the third sub voltage variation when the second sub voltage level difference is less than the first reference voltage level difference, and is less than each of the first sub voltage variation, second sub voltage variation, and the third sub voltage variation when the second sub voltage level difference is greater than the second reference voltage level difference.

The method may include calculating an average voltage level difference based on the first sub voltage level difference to the third sub voltage level difference, and comparing the average voltage level difference with a first reference voltage level difference and a second reference voltage level difference greater than the first reference voltage level difference, wherein: when the average voltage level difference is greater than the first reference voltage level difference and less than the second reference voltage level difference, each of the first sub voltage variation, second sub voltage variation, and the third sub voltage variation is greater than the first sub voltage variation, second sub voltage variation, and the third sub voltage variation when the average voltage level difference is less than the first reference voltage level difference, and is less than each of the first sub voltage variation, second sub voltage variation, and the third sub voltage variation when the average voltage level difference is greater than the second reference voltage level difference. The method may include storing the first and second data voltages, and generating the third data voltage based on the voltage level difference.

In accordance with one or more other embodiments, an apparatus includes first logic to generate a first data voltage corresponding to a first grayscale value and a second data voltage corresponding to a second grayscale value lower than the first grayscale value based on a reference voltage; and second logic to generate a third data voltage corresponding to a third grayscale value lower than the second grayscale value based on a voltage level difference between the first data voltage and the second data voltage.

The second logic may include a first calculator to calculate the voltage level difference based on the first data voltage and the second data voltage; a second calculator to calculate a voltage variation based on the voltage level difference from the first calculator; and a third calculator to calculate the third data voltage based on the voltage variation from the second calculator and the second data voltage, wherein the third data voltage is based on one of a sum of or a difference between the second data voltage and the voltage variation.

The apparatus may include logic to supply at least one of the first data voltage, the second data voltage, or the third data voltage to a display panel which includes a first pixel to emit light of a first wavelength, a second pixel to emit light of a second wavelength shorter than the first wavelength, and a third pixel to emit light of a third wavelength shorter than the second wavelength, each of the first and second data voltages includes a first sub data voltage corresponding to the first pixel, a second sub data voltage corresponding to the second pixel, and a third sub data voltage corresponding to the third pixel, the voltage level difference includes a first sub voltage level difference corresponding to the first pixel, a second sub voltage level difference corresponding to the second pixel, and a third voltage level difference corresponding to the third pixel, and the voltage variation includes a first sub voltage variation corresponding to the first pixel, a second sub voltage variation corresponding to the second pixel, and a third sub voltage variation corresponding to the third pixel.

BRIEF DESCRIPTION OF THE DRAWINGS

Features will become apparent to those of skill in the art by describing in detail exemplary embodiments with reference to the attached drawings in which:

FIG. 6 illustrates an example of voltage variation generated by a data voltage generation circuit;

FIG. 7 illustrates another example of voltage variation by a data voltage generation circuit.

DETAILED DESCRIPTION

Figure 1:
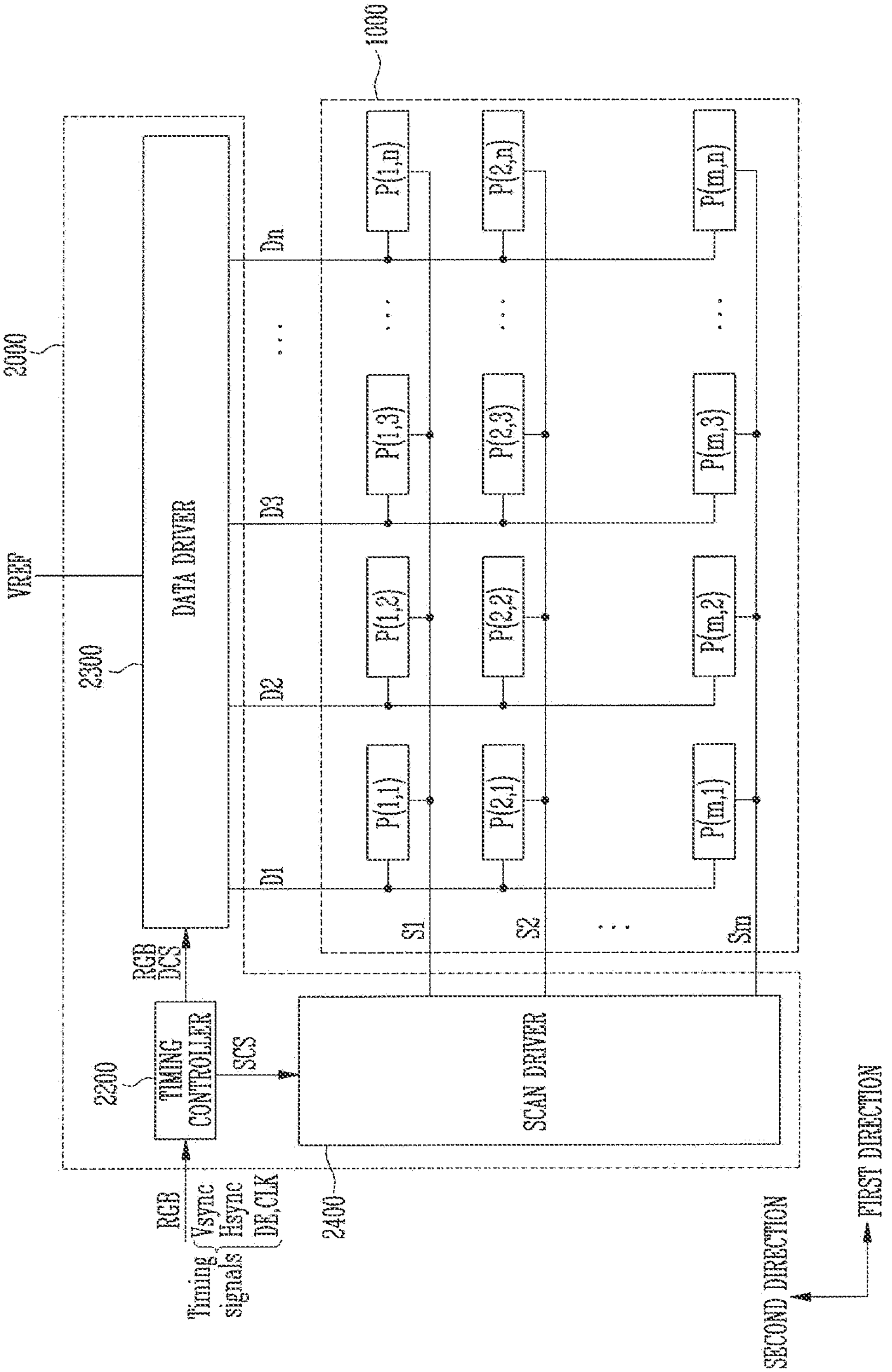
FIG. 1 illustrates an embodiment of an organic light emitting display device.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. The embodiments may be combined to form additional embodiments.

In the drawings, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

When an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

FIG. 1 illustrates an embodiment of an organic light emitting display device which includes a display panel 1000 and a display panel driving unit 2000. The display panel 1000 may include pixels P(1, 1) to P(m, n) where each of m and n is a positive integer more than 3, scan lines S1 to Sm which transfer scan signals to the pixels P(1, 1) to P(m, n)), and data lines D1 to Dn which transfer data voltages to the pixels P.

Among the pixels P, the pixel P(1, 1) may emit light of a first wavelength, the pixel P(1, 2) may emit a second wavelength shorter than the light of the first wavelength, and the pixel P(1, 3) may emit light of a third wavelength shorter than the light of the second wavelength. For example, the light of the first wavelength may be included in a red light region, the light of the second wavelength may be included in a green light region, and the light of the third wavelength may be included in a blue light region.

The display panel driving unit 2000 may drive the display panel 1000 by generating and supplying data voltages to the data lines and by generating and supplying scan signals to the scan lines.

The display panel driving unit 2000 may include a timing controller TC 2200, a data driver 2300, and a scan driver 2400. The timing controller 2200, the data driver 2300, and the scan driver 2400 may be respectively embodied in separate electronic devices or these circuits and/or the entire display panel driving unit 2000 may be embodied in a single electronic device, e.g., a display driving integrated circuit (IC).

The timing controller 2200 generates timing control signals to control the driving timing of the data driver 2300 and the scan driving unit 2400. The timing control signals may be received, for example, from an external device. The timing control signals may include, for example, a vertical synchronization signal Vsync, a horizontal synchronization signal Hsync, a data enable signal DE, and a dot clock signal CLK. In one embodiment, the timing control signals may include a scan timing control signal SCS to control the driving timing of the scan driver 2400 and a data timing control signal DSC to control the driving timing and the data voltage of the data driver 2300. The data timing control signal DCS may control a data sampling start timing of the data driver 2300. In addition, the timing controller 2200 may output image data RGB to the data driver 2300 so that the display panel 1000 may display the image.

The data driver 2300 may latch the image data RGB from the timing controller 2200 in response to the data timing control signal DCS. A reference voltage VREF may be supplied to the data driver 2300, and the data voltages may be generated based on the reference voltage VREF. The data driver 2300 may include a number of source drive ICs electrically connected to the data lines D of the display panel 1000, for example, by a chip-on-glass (COG) process or a tape automated bonding (TAB) process.

The scan driver 2400 applies the scan signals to the scan lines sequentially in response to the scan timing control signal SCS. The scan driver 2400 may be directly formed on a substrate of the display panel 1000, for example, by a gate-in-panel (GIP) process or may be electrically connected to the scan lines by a TAB process.

Figure 2:
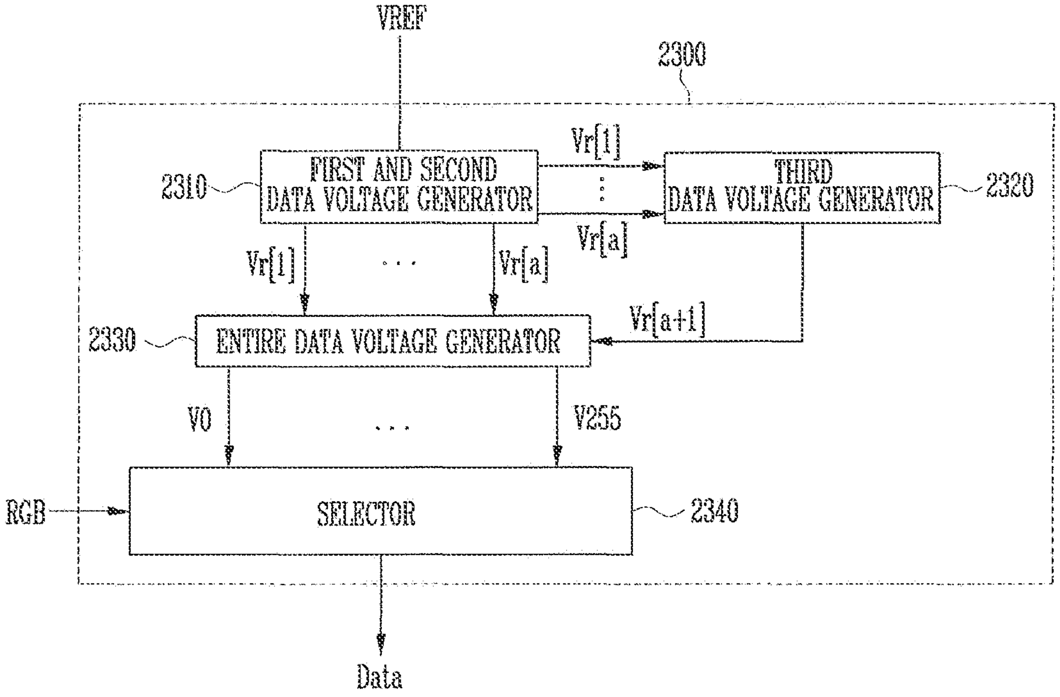
FIG. 2 illustrates an embodiment of a data driver.

FIG. 2 illustrates an embodiment of a data driver, which, for example, may correspond to data driver 2300 in FIG. 1. Referring to FIGS. 1 and 2, the data driver 2300 includes a first and second data voltage generator, a third data voltage generator 2320, an entire data voltage generator 2330, and a selector 2340.

The first and second data voltage generator 2310 generates a first data voltage Vr[1] to an ath data voltage Vr[a], where r[1] is a positive integer more than 0 and r[a] is a positive integer between 0 and r1. The first data voltage Vr[1] to the ath data voltage Vr[a] may be generated, for example, by a resistance distribution among resistors in the first and second data voltage generator 2310. The data voltages may correspond to grayscale values in a predetermined range of values, e.g., grayscales values 0 to 255. The brightness of light may increase with increasing grayscale value. The grayscale value of 0 may be a black grayscale value and the grayscale value of 255 may correspond to a brightness different from the maximum brightness.

The first data voltage Vr[1] may correspond to a first representative grayscale value r[1] and may be the first data voltage. The ath data voltage Vr[a] may correspond to grayscale value r[a] which is an ath representative grayscale value r[a] and may be a second data voltage. The first grayscale may be the grayscale value r[1] and a second grayscale may be the grayscale value r[a]. In addition, the grayscale value r[1] may have the highest value of the grayscale value r[1] to the grayscale value r[a] (for example, 255), and the grayscale value r[a] may have the lowest value of the grayscale value r[1] to the grayscale value r[a] (for example, 11).

Levels of the first data voltage Vr[1] to the ath data voltage Vr[a] may be corrected by optical measurement. In the case of the display device such as an organic light emitting display device, the brightness of light emitted by the display device may be distorted by an error in manufacturing. To prevent or reduce adverse effects of this distortion, at least part of the data voltages may be corrected by optical measurement.

In accordance with at least one embodiment, correction based on optical measurement refers to correcting data voltages based on a comparison of the brightness corresponding to grayscale value and brightness actually emitted from the display device. The degree of distortion of the displayed brightness may be significantly reduced by performing optical correction measurement.

In one embodiment, the number of the data voltages Vr[1] to the Vr[a] generated by the first and second data voltage generator 2310 may be sent to the entire data voltage generation circuit 2330, and the first data voltage Vr[1] and the ath data voltage Vr[a] may be sent to the third data voltage generator 2320.

The third data voltage generator 2320 may generate a+1th data voltage (Vr[a+1] and r[a+1] are positive integer between 0 and r[a]) based on the voltage level difference between the first data voltage Vr[1] and the ath data voltage Vr[a]. The a+1 data voltage Vr[a+1] may correspond to grayscale value r[a+1] representative of grayscale value a+1th. The a+1th data voltage Vr[a+1] may be the third data voltage. For example, the grayscale value r[a+1] may have the value of 3. The a+1th data voltage Vr[a+1] generated by the third data voltage generator 2320 may be sent to the entire data voltage generator 2330.

The entire data voltage generator 2330 may generate remaining data voltages which are not generated among 255 data voltages on the basis of the (a+1) data voltages Vr[1] to Vr[a+1] generated by the first and second data voltage generator 2310 or the third data voltage generator 2320. The remaining data voltages may be generated using an interpolation method with respect to the (a+1) data voltages generated by the first and second data voltage generator 2310 or the third data voltage generator 2320.

When all of the data voltages in the entire grayscale range are corrected by optical measurement, a significant amount of time and expense may be required. However, in accordance with the present embodiment, optical measurement may be performed to correct only a portion of the data voltages and the remaining data voltages may be generated by an interpolation method. As a result, the time and expense associated with correction may be reduced. Thus, the entire data voltage generator 2330 may output data voltages from data voltage Vo corresponding to grayscale value 0 to a data voltage V255 corresponding to grayscale value 255 to the selector 2340.

The selector 2340 may generate a data voltage Data by selecting at least one of the 255 generated data voltages. The generated data voltage Data may be supplied to one of the data lines of the display panel 100. In one embodiment, the selector 2340 may include a multiplexer which selects one of 255 data voltages (V0 to V255) as the data voltage Data on the basis of the image data RGB from the timing controller 2200.

In one embodiment, when the display panel 1000 emits light corresponding to the first to third wavelengths, each of the first data voltage Vr[1] to the a+1th data voltage Vr[a+1] may include a first sub data voltage corresponding to a first wavelength, a second sub data voltage corresponding to the second wavelength, a third sub data voltage corresponding to the third wavelength.

Figure 3:
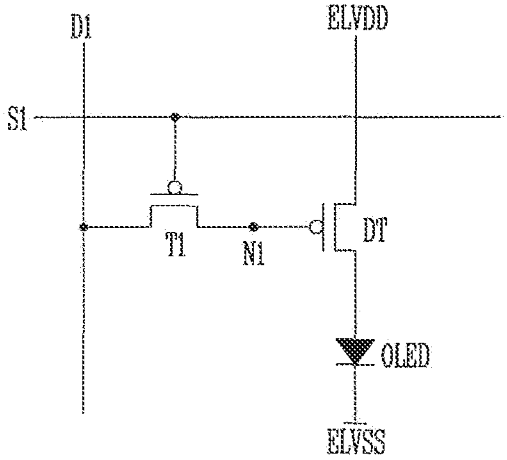
FIG. 3 illustrates an embodiment of a pixel of the display device.

FIG. 3 illustrates an embodiment a pixel, which may be representative of the pixels in the organic light emitting display device of FIG. 1. For convenience of explanation, a pixel P (1, 1) among the pixels is described.

The pixel P (1, 1) includes a driving transistor DT, a first transistor T1, and the organic light emitting display device. The driving transistor DT and the first transistor T1 may be a p-channel type transistor. In another embodiment, these transistors may be n-channel type transistors.

A first power ELVDD may be supplied to a first electrode of the driving transistor DT, a second electrode of the driving transistor DT may be electrically connected to an anode of the organic light emitting diode (OLED), and a gate electrode of the driving transistor DT may be electrically connected to a first node N1.

A first electrode of the first transistor T1 may be electrically connected to a data line D1, a second electrode of the first transistor T1 may be electrically connected to the first node N1, and the gate electrode of the transistor T1 may be electrically connected to a scan line S1.

The anode of the organic light emitting diode (OLED) may be electrically connected to the second electrode of the driving transistor DT, and a second power ELVSS may be supplied to a cathode of the organic light emitting diode (OLED). A voltage level of the first power ELVDD may be higher than the voltage level of the second power ELVSS. The light emitting brightness of the organic light emitting diode (OLED) may be in proportion to a current level which flows into the organic light emitting diode (OLED).

When the scan signal is supplied to the scan lines S1, the first transistor T1 is turned on, and the data voltage supplied to the data line D1 may be transferred to the first node N1. The driving transistor DT may control the current level supplied to the organic light emitting diode (OLED). The current level supplied to the organic light emitting diode (OLED) may be a function of the voltage level difference between the first power ELVDD and the first node N1. The wavelength of light emitted by the pixel P (1, 1) may vary, for example, depending on materials of the organic light emitting diode (OLED).

In another embodiment, the pixel P (1, 1) may have a different structure, including but not limited to one which includes a different number of transistors and/or a capacitor.

Figure 4:
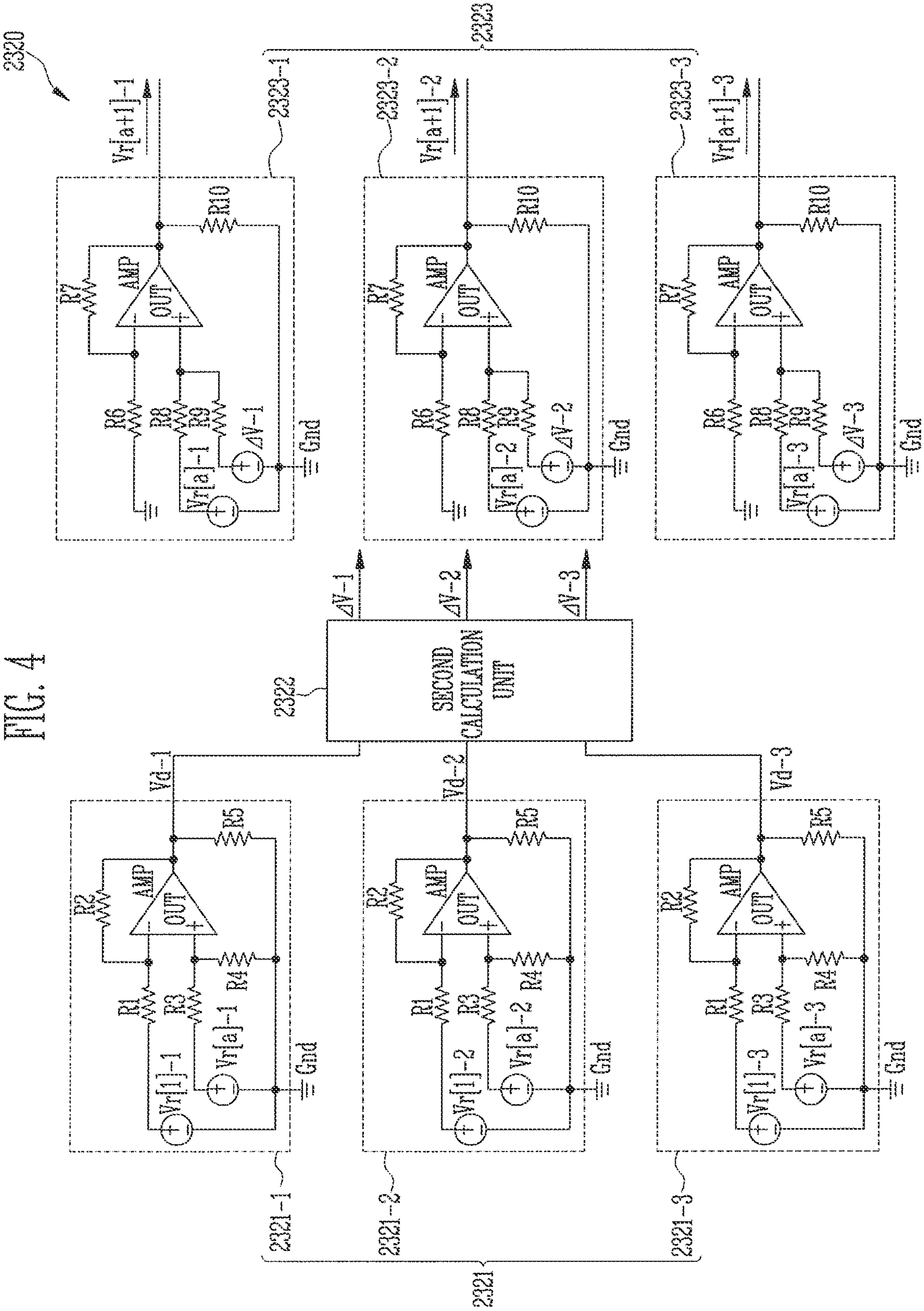
FIG. 4 illustrates an embodiment of a data voltage generation circuit.

FIG. 4 illustrating an embodiment of the third data voltage generator 2320 of the data driver 2300 in FIG. 2. Referring to FIGS. 1 and 4, the third data voltage generator 2320 includes a first calculation unit 2321, a second calculation unit 2322, and a third calculation unit 2323. The first calculation unit 2321 may calculate a voltage level difference based on the first data voltage and the second data voltage from the first and second data voltage generator 2310. The first calculation unit 2321 includes a first calculation unit 2321-1 for the pixel P(1, 1), a first calculation unit 2321-2 for the pixel P(1, 2), and a first calculation unit 2321-3 for the pixel P(1, 3). For convenience of explanation, the first calculation unit 2321-1 will be described.

The first calculation unit 2321-1 may include a first resistor to a fifth resistor (R1 to R5) and a calculation amplifier AMP. The calculation amplifier AMP may have an inverting input terminal (−), a non-inverting input terminal (+), and an output terminal OUT. The calculation amplifier AMP may also include terminals for receiving power. One end of the first resistor R1 may be electrically connected to the inverting input terminal (−) of the calculation amplifier AMP. The first sub data voltage Vr[1]−1 of the first data voltage may be supplied to the other end of the first resistor R1.

A second resistor R2 may be electrically connected between the inverting input terminal (−) of the calculation amplifier AMP and the output terminal OUT of the calculation amplifier AMP.

One end of a third resistor R3 may be electrically connected to the non-inverting terminal (+) of the calculation amplifier AMP, and the first sub data voltage Vr[a]−1 of the ath data voltage may be supplied to the other end of the third resistor R3.

A fourth resistor R4 may be electrically connected between the non-inverting input terminal (+) of the calculation amplifier AMP and a ground Gnd.

A fifth resistor R5 may be electrically connected between the output terminal OUT of the calculation amplifier AMP and the ground Gnd.

In this case, the voltage level of the output terminal OUT of the calculation amplifier AMP may be represented by Equation 1:

$$Vout = \frac{(R1 + R2)R4}{R1(R3 + R4)}(Vr[a] - 1) - \frac{R2}{R1}(Vr[1] - 1) \tag{1}$$

where Vout corresponds to the voltage level of output terminal OUT of calculation amplifier AMP, Vr[1]−1 corresponds to the level of first sub data voltage Vr[1]−1 of first data voltage, Vr[a]−1 corresponds to the level of first sub data voltage Vr[a]−1 of ath data voltage, R1 corresponds to the level of first resistor, R2 corresponds to the level of second resistor, R3 corresponds to the level of third resistor, and R4 corresponds to the level of fourth resistor.

When the level of first resistor R1 to the level of fourth resistor R4 are the same, Equation 1 will be represented by Equation 2:

$$Vout(Vr[a] - 1) - (Vr[1] - 1) \tag{2}$$

where Vout corresponds to the level of output terminal OUT of calculation amplifier AMP, Vr[1]−1 corresponds to the level of first sub data voltage Vr[1]−1 of first data voltage, and Vr[a]−1 corresponds to the level of first sub data voltage Vr[a]−1 of ath data voltage.

The voltage level of the output terminal OUT of the calculation amplifier AMP may correspond to a level difference between the first sub data voltage Vr[1]−1 of the first data voltage and the first sub data voltage Vr[a]−1 of the ath data voltage, e.g., a first sub voltage level difference Vd−1.

In the same manner, the first calculation unit 2321-2 with respect to pixel P (1, 2) and the first calculation unit 2321-3 with respect to pixel P (1, 3) may generate a second sub voltage level difference Vd−2 and a third sub voltage level difference Vd−3, respectively. The first sub voltage level difference Vd−1, the second sub voltage level difference Vd−2, and the third sub voltage level difference Vd−3 may be included in the voltage level difference and transferred to the second calculation unit 2322.

The second calculation unit 2322 may generate the voltage variation based on of the voltage level difference. The voltage variation may include, for example, a first voltage variation ΔV−1 corresponding to the pixel P (1, 1), a second voltage variation ΔV−2 corresponding to the pixel P (1, 2), and a third voltage variation ΔV−3 corresponding to the pixel P (1, 3).

The third calculation unit 2323 may calculate the a+1th data voltage Vr[a+1] based on a voltage variation from the second calculation unit 2322 and the ath data voltage Vr[a]) from the first and second data voltage generator 2310. The third calculation unit 2323 includes the third calculation unit 2323-1 for the first pixel P(1, 1)), the third calculation unit 2323-2 for the second pixel P(1, 2), and the third calculation unit 2323-3 for the third pixel P(1, 3). Only the calculation unit 2323-1 will be described for convenience of explanation.

The third calculation unit 2323-3 for the first pixel P (1, 1) includes a sixth resistor to a tenth resistor (R6 to R10) and the calculation amplifier AMP. The calculation amplifier AMP includes the inverting input terminal (−), the non-inverting input terminal (+), and the output terminal OUT. The calculation amplifier AMP may also include terminals for receiving power.

A sixth resistor R6 may be electrically connected between the inverting input terminal (−) of the calculation amplifier AMP and the ground Gnd.

A seventh resistor R7 may be electrically connected between the inverting input terminal (−) of the calculation amplifier AMP and the output terminal OUT of the calculation amplifier AMP.

One end of an eighth resistor R8 may be electrically connected to the non-inverting input terminal (+) of the calculation amplifier AMP, and the first sub data voltage Vr[a]-1 of the ath data voltage may be supplied to the other end of the eighth resistor R8.

One end of a ninth resistor R9 may be electrically connected to the non-inverting input terminal (+) of the calculation amplifier AMP, and the first sub voltage variation ΔV−1 may be supplied to the other end of the ninth resistor R9.

A tenth resistor R10 may be electrically connected between the output terminal OUT of the calculation amplifier AMP and the ground Gnd.

In this case, the voltage level of the output terminal OUT of the calculation amplifier AMP will be represented by Equation 3:

$$Vout = \frac{(R6 + R7)R9}{R6(R8 + R9)}(Vr[a] - 1) + \frac{(R6 + R7)R8}{R6(R8 + R9)}(\Delta V - 1) \tag{3}$$

where Vout corresponds to the voltage level of output terminal OUT of calculation amplifier AMP, Vr[a]−1 corresponds to the level of first sub data voltage Vr[a]−1 of ath data voltage, ΔV−1 corresponds to the first sub voltage variation, R6: level of sixth resistor 6, R7 corresponds to the level of seventh resistor, R8 corresponds to the level of eighth resistor, and R9 corresponds to the level of ninth resistor.

When the sixth to the ninth resistors are the same, Equation 3 may be represented as Equation 4:

$$Vout = (Vr[a] - 1) - (\Delta V - 1) \tag{4}$$

The voltage level of the output terminal OUT of the calculation amplifier AMP may correspond to a sum of the first sub data voltage Vr[a]−1 and the first voltage variation ΔV−1 of the ath data voltage. The third calculation unit 2323-1 with respect the pixel P(1, 1) may output the output terminal OUT of the calculation amplifier AMP to the first sub data voltage Vr[a+1]−1 of the a+1th data voltage.

In the same manner, the third calculation unit 2323-2 for the pixel P(1, 2) and the third calculation unit 2323—for the pixel P(1, 3) may generate the second sub data voltage Vr[a+1]−2 of the a+1th data voltage and the sub third data voltage Vr[a+1]−3 of the a+1th data voltage. The a+1th data voltage Vr[a+1] may be transferred to the entire data voltage generation circuit 2330. In one embodiment, the a+1th data voltage Vr[a+1] may be generated based on the difference of the first sub data voltage Vr[a]−1 and the first sub voltage variation ΔV−1, instead of the sum.

Figure 5:
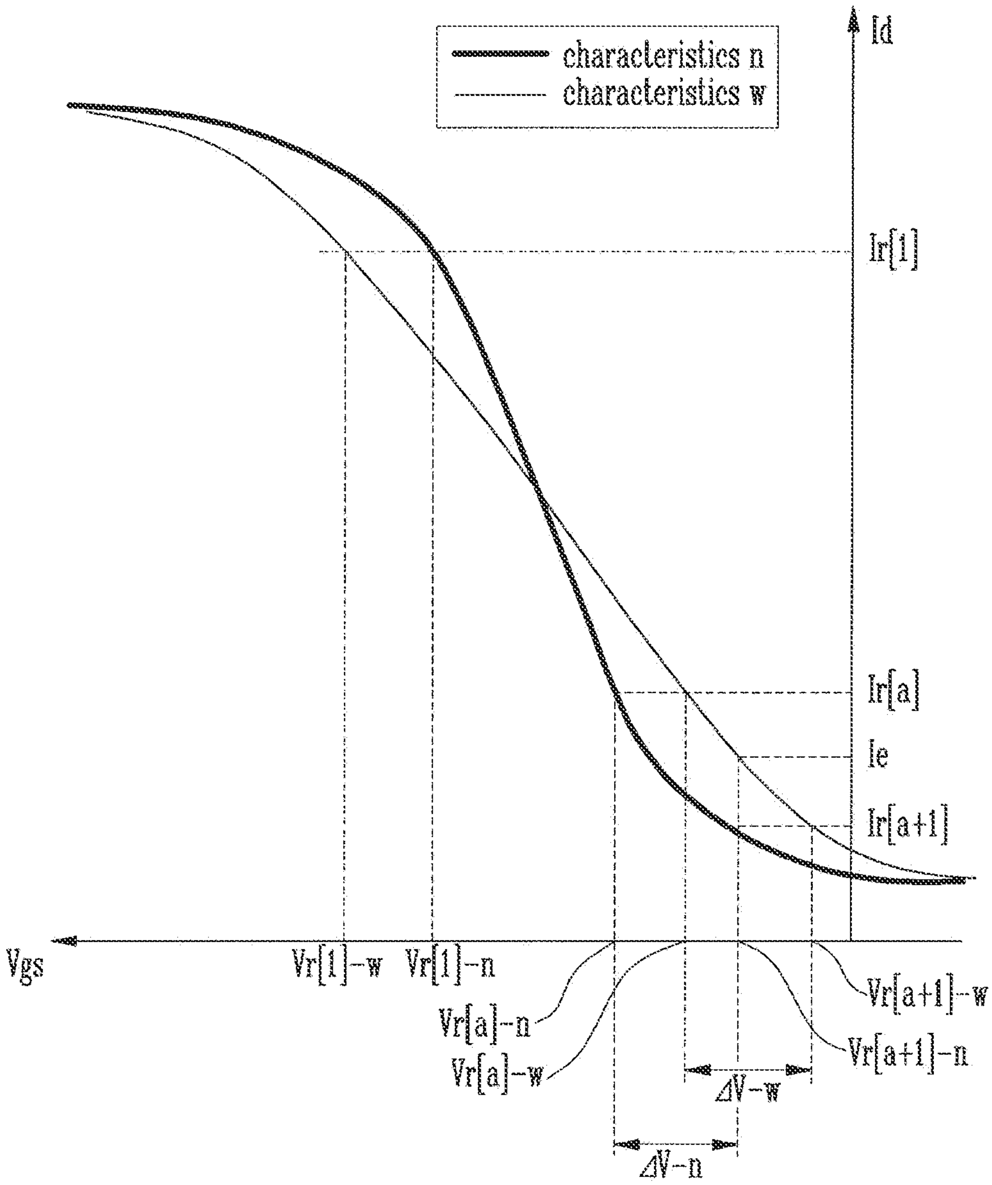
FIG. 5 illustrates an example of driving transistor characteristics.

FIG. 5 illustrating an example of the characteristics of a driving transistor, which, for example, may correspond to the driving transistor DT in FIG. 3. In FIG. 5, a voltage level difference Vgs between the gate electrode and the source electrode of the driving transistor DT is plotted against the current level Id flowing between the source electrode and the drain electrode of the driving transistor DT.

Referring to FIGS. 3 and 5, the characteristics of the driving transistor DT may vary from panel to panel due to a deviation or error during a manufacturing process. For example, the characteristics of the transistor DT may be distinguishable based on the range of the voltage level difference Vgs between the gate electrode and the source electrodes (e.g., dynamic range) to satisfy the current level Id corresponding to grayscale values of 0 to 255. (For convenience of explanation, when the dynamic range is not considered to be large, the driving transistor DT may have characteristics n. When the dynamic range is relatively large, the dynamic range may have characteristics w.)

Since the grayscale value r[1] is high, the brightness and proportional current level Id may be corrected by optical measurement. When the first data voltage Vr[1]-n for characteristics n is supplied to the gate electrode of the driving transistor DT having characteristics n, the current level flowing between the source electrode and the drain electrode of the driving transistor DT may be the current level Ir[1] corresponding to the grayscale value r[1].

In the same manner, when the first data voltage Vr[1]-w for characteristics w is supplied to the gate electrode of the driving transistor DT having characteristics w, the current level flowing between the source electrode and the drain electrode of the driving transistor DT may be the current level Ir[1] corresponding to the grayscale value r[1]. Since the r[a] grayscale value is high, the brightness and proportional current level Id may be corrected by optical measurement.

Therefore, regardless of whether the driving transistor DT has characteristics n or characteristics w, the current level Ir[a] corresponding to the grayscale value r[a] between the source and drain electrodes of the driving transistor DT may flow.

As shown in FIG. 5, the difference between the first data voltage Vr[1]-n corresponding to the characteristics n and the ath data voltage Vr[a]-n corresponding to characteristics n may be less than the first voltage Vr[1]-n corresponding to characteristics w and the ath data voltage Vr[a]-w corresponding to characteristics w. Thus, it may be determined whether the driving transistor DT has characteristics n or characteristics w based on the voltage level difference between the first data voltage Vr[1] and the ath data voltage Vr[a].

In the case of the grayscale value r[a+1], it may be difficult to perform optical measurement since the corresponding brightness is too low. For example, when the a+1th data voltage Vr[a+1]-n corresponding to characteristics n is supplied to the gate electrode of the driving transistor DT having characteristics w, the current level flowing between the source electrode and the drain electrode of the driving transistor DT may be distorted to an inappropriate current level Ie, which is not the current level Ir[a+1] corresponding to the grayscale r[a+1].

If it is possible to know whether the driving transistor DT has characteristics n or characteristics w, based on the ath data voltage Vr[a] corrected by the optical measurement, the a+1th data voltage Vr[a+1] may be presumed. For example, through experiment, the voltage variation ΔV-n between the ath data voltage Vr[a]-n corresponding to characteristics n and the a+1th data voltage Vr[a+1]-n corresponding to characteristics n, and the voltage variation ΔV-w between the ath data voltage Vr[a]-w corresponding to characteristics w and the a+1th data voltage Vr[a+1]-w corresponding to characteristics w may be measured. After experimentation, even if the optical feature is not applied to the grayscale r[a+1], based on the features of the driving transistor DT and the ath data voltage Vr[a] corrected by optical measurement, the a+1th data voltage Vr[a+1] may be generated. The voltage level may be generated in the second calculation unit 2322, and driving of the second calculation unit 2322 may be described, for example, referring to FIG. 6 or FIG. 7.

FIG. 6 illustrates an example of the voltage variation generated by the second calculation unit 2322 of the third data voltage generator of FIG. 4. In the second calculation unit 2322, the characteristics of the driving transistor DT may be determined by the second sub voltage level difference Vd−2 of the first sub voltage level difference Vd−1 to the third sub voltage level difference Vd−3. Among the organic light emitting diodes (OLED) of the pixel P (1, 1) to the pixel P (1, 3), the organic light emitting diode (OLED) of the pixel P (1, 2) which emits the second wavelength shorter than the first wavelength may have the highest light emitting efficiency, so that in-depth correction is required.

The second calculation unit 2322 may compare the second voltage level difference Vd−2 with the first reference voltage level difference Vdref1 and the second reference voltage level difference Vdref2 which is greater than the first reference voltage level difference Vdref1. When the second sub voltage level difference Vd−2 is less than the first reference voltage level difference Vdref1, the second calculation unit 2322 may determine that the driving transistor DT has first characteristics. When the second sub voltage level difference Vd−2 is greater than the first reference voltage level difference Vdref1 and less than the second reference voltage level difference Vdref2, the second calculation unit 2322 may determine that the driving transistor DT has second characteristics. When the second sub voltage level difference Vd−2 is greater than the second reference voltage level difference Vdref2, the second calculation unit 2322 may determine that the driving transistor DT has third characteristics.

The dynamic range of the driving transistor DT having the second characteristics may be greater than the dynamic range of the driving transistor DT having the first characteristics, and may be less than the dynamic range of the driving transistor DT having the third characteristics. Therefore, the first sub voltage variation ΔV−1, the second voltage variation ΔV−2, and third voltage variation ΔV−3 may be controlled based on these characteristics.

In the case of the first sub voltage variation ΔV−1, the first sub voltage variation ΔV−12 corresponding to the second characteristics may be greater than the first sub voltage variation ΔV−11 corresponding to the first characteristics and less than the first sub voltage variation ΔV−13 corresponding to the third characteristics.

In the case of the second sub voltage variation ΔV−2, the second sub voltage variation ΔV−22 corresponding to the second characteristics may be greater than the second sub voltage variation ΔV−21 corresponding to the first characteristics and less than the second sub voltage variation ΔV−23 corresponding to the third characteristics.

In the case of the third sub voltage variation ΔV−3, the third sub voltage variation ΔV−32 corresponding to the second characteristics may be greater than the third sub voltage variation ΔV−31 corresponding to the first characteristics and less than the third sub voltage variation ΔV−33 corresponding to the third characteristics.

Levels of nine sub voltage variations ΔV−11 to ΔV−33 may be stored in the second calculation unit 2322 determined by experiment. When the driving transistor DT has the first characteristics, the second calculation unit 2322 may output the first sub voltage variation ΔV−11, the second sub voltage variation ΔV−21, and the third sub voltage variation ΔV−31. When the driving transistor DT has the second characteristics, the second calculation unit 2322 may output the first sub voltage variation ΔV−12, the second sub voltage variation ΔV−22, and the third sub voltage variation ΔV−32. When the driving transistor DT has the third characteristics, the third calculation unit 2322 may output the first sub voltage variation ΔV−13, the second sub voltage variation ΔV−23, and the third sub voltage variation ΔV−33.

FIG. 7 illustrates another example of voltage variation generated by a second calculation unit of a third data voltage generator of FIG. 4. Referring to FIGS. 1 to 5 and 7, the second calculation unit 2322 may calculate an average voltage level Vd-av based on the first sub voltage level difference Vd−1 to the third voltage level difference Vd−3. The characteristics of the driving transistor DT may be determined by comparing the average voltage level difference Vd-av with the first reference voltage level difference Vdref1 and the second reference voltage level difference Vdref2 greater than the first reference voltage level difference Vdref1.

The average may be calculated, for example, based on an arithmetic mean and/or a geometric mean, and in the consideration of the characteristics of the pixel P (1, 1) to the pixel P (1, 3) a weighted value may be used. It may be advantageous for some applications to use the weighted value when correction is to be performed with regard to the pixel P (1, 1) to the pixel P (1, 3).

When the average voltage level difference Vd-av is less than the first reference voltage level difference Vdref1, the second calculation unit 2322 may determine that the driving transistor DT has the first characteristics. When the average voltage level difference Vd-av is greater than the first reference voltage level difference Vdref1 and less than the second reference voltage level difference Vdref2, the second calculation unit 2322 may determine that the driving transistor DT has the second characteristics. When an average voltage level difference Vd-av is greater than the second reference voltage level difference Vdref2, the second calculation unit 2322 may determine that the driving transistor DT has the third characteristics.

Nine sub voltage variations ΔV−11' to ΔV−33' may correspond to the nine sub voltage variations ΔV−11 to ΔV−33. Levels of the nine sub voltage variations ΔV−11' to ΔV−33' may be determined by experiment and stored in the second calculation unit 2322. When the driving transistor DT has the first characteristics, the second calculation unit 2322 may output the first sub voltage variation ΔV−11', the second sub voltage variation ΔV−21', and the third sub voltage variation ΔV−31'. When the driving transistor DT has the second characteristics, the second calculation unit 2322 may output the first sub voltage variation ΔV−12', the second sub voltage variation ΔV−22', and the third sub voltage variation ΔV−32'. When the driving transistor DT has the third characteristics, the third calculation unit 2322 may output the first sub voltage variation ΔV−13', the second sub voltage variation ΔV−23', and the third sub voltage variation ΔV−33'.

FIGS. 8 to 11 illustrate an example of performance that may be achieved when data driver in accordance with one or more of the embodiments disclosed herein. Since less than a grayscale value of 6 is not distinguishable with the naked eye, it is considered that distortion is reduced when the degree of distortion of color and the degree of distortion of brightness are reduced in the case of a grayscale value of 7 or more. In addition, the grayscale value may be one of 0 to 255 in this example. However, in FIGS. 8 to 11, the degree of distortion is measured only when the grayscale value has a value of 0 to 11.

Figure 8:
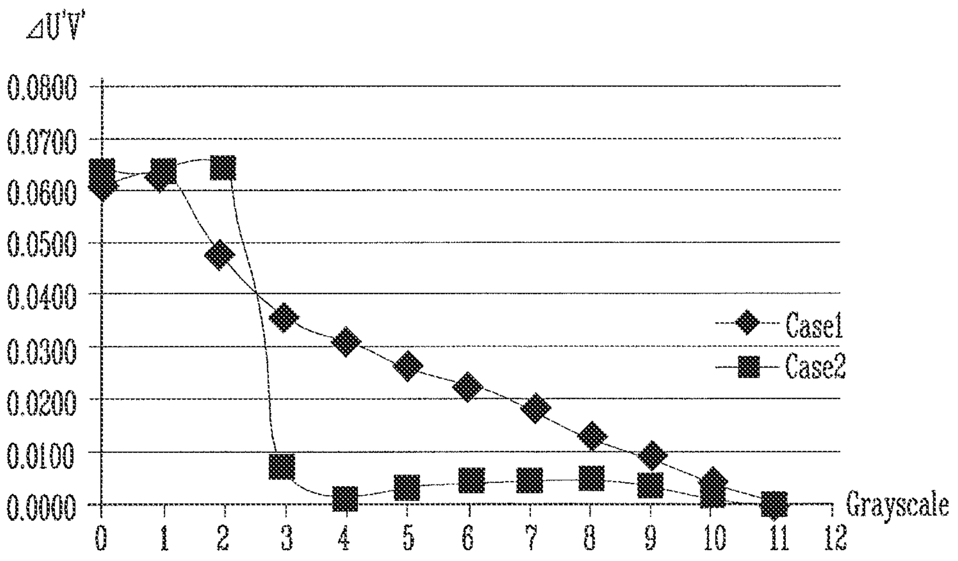
FIGS. 8 to 11 illustrate an example of the performance of one embodiment of a data driver.

FIG. 8 illustrates a comparison of the degree of distortion of the color of light emitted by the pixel in the case where the data driver is used or and in the case where actual light emitting brightness is greater than the objective brightness. In FIG. 8, axis Y represents color distortion degree ΔU'V'. The organic light emitting diode (OLED) of the pixel P(1, 2) in FIG. 1 may have the highest light emitting efficiency. When correction by optical measurement is not performed, the actual light emitting brightness may increase greatly compared to the objective brightness of the second wavelength, and thus color distortion may be generated.

Referring to FIG. 8, the degree of color distortion within the section of grayscale values of more than 7 for Case 2 (in which the data driver according to one or more embodiments is used) is less than the degree of color distortion within the section of grayscales values more than 7 for Case 1 (in which the data driver according to one more embodiments is not used).

Figure 9:
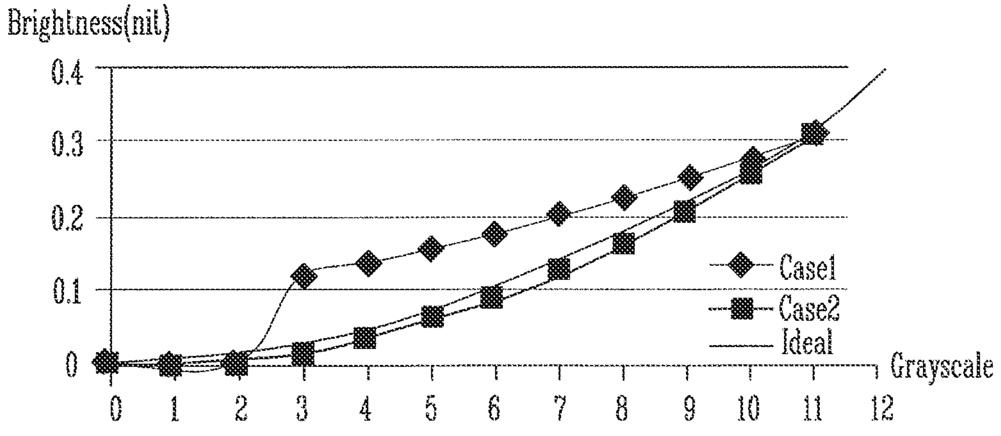

FIG. 9 illustrates a comparison of the degree of brightness distortion in the case where the data driver according to one or more embodiments is used and in the case where actual light emitting brightness is greater than the objective brightness. When the actual light emitting brightness increases greatly compared to the objective brightness of the second wavelength, the light emitting brightness itself may be distorted in addition to color distortion. In one embodiment, the distortion of light emitting brightness itself may be defined to include a deviation between the actual light emitting brightness and an ideal brightness.

Referring to FIG. 9, the degree of brightness distortion within the section of grayscale values more than 7 for Case 2 (in which the data driver according to one or more embodiments is used) is less than the degree of brightness distortion within the section of grayscale values more than 7 in Case 1 (in which the data driver according to one or more embodiments is not used).

Figure 10:
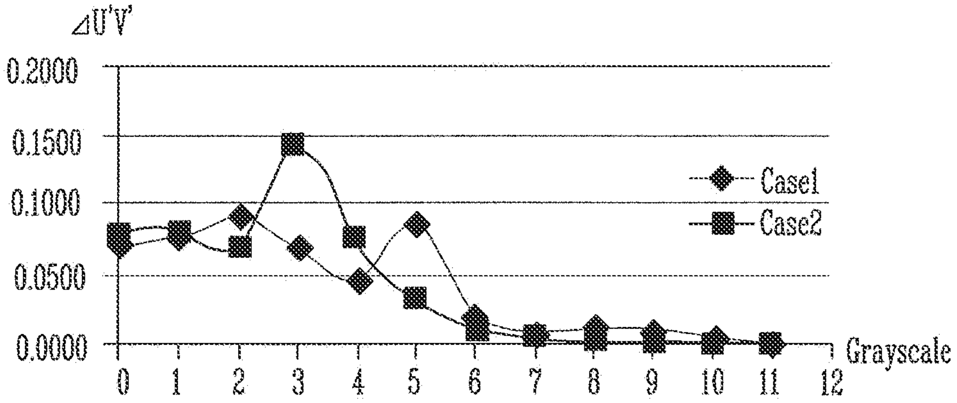

FIG. 10 illustrates an example of a comparison of the degree of color distortion of light emitted from the pixel when the data driver according to one or more embodiments is used and in the case actual light emitting brightness of the pixel P (1, 1) to the pixel P (1, 3) is less than the objective brightness. In FIG. 10, axis Y may represent the color distortion degree ΔU'V'. When the actual light emitting brightness of the pixel P (1, 1) to the pixel P (1, 3) is less than the objective brightness, the actual light emitting brightness may decrease relative to the objective brightness of the first to third wavelengths and color distortion may occur.

Referring to FIG. 10, it is found that the degree of color distortion within the section of grayscale values more than 7 for Case 2 (in which the data driver according to one or more embodiments described herein is used) is less than the degree of color distortion within the section of grayscale values more than 7 for Case 1 (in which the data driver according to one or more embodiments is not used).

Figure 11:
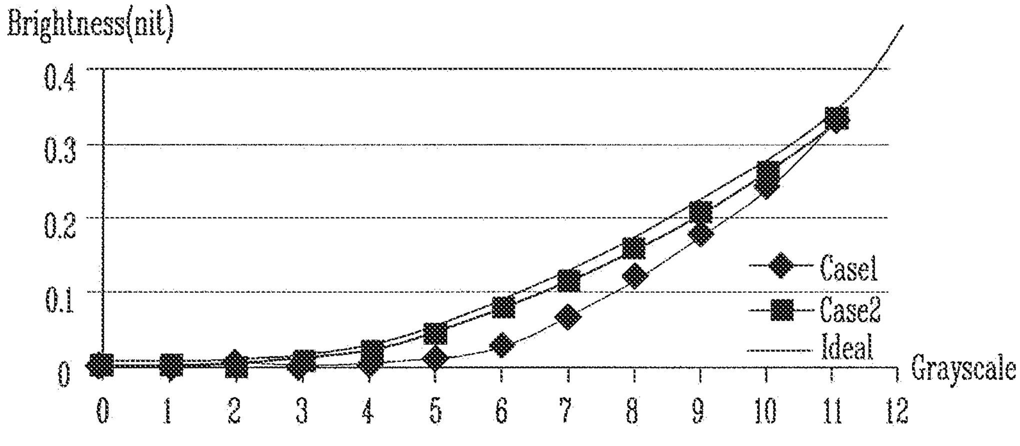

FIG. 11 illustrates an example of a comparison of the degree of brightness distortion when the data driver according to one or more embodiments described herein is used and in the case the actual light emitting brightness of the pixel P (1, 1) to the pixel P (1, 3) is less than the objective brightness. Referring to FIG. 11, it is found that the degree of brightness distortion within the section of grayscale values more than 7 for Case 2 (in which the data driver according to one or more embodiments described herein is used) is less than the degree of brightness distortion within the section of grayscale values more than 7 for Case 1 (in which the data driver according to one or more embodiments is not used).

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods described herein.

The generators, calculators, selectors, drivers, and other processing features of the embodiments disclosed herein may be implemented in logic which, for example, may include hardware, software, or both. When implemented at least partially in hardware, the generators, calculators, selectors, drivers, and other processing features may be, for example, any one of a variety of integrated circuits including but not limited to an application-specific integrated circuit, a field-programmable gate array, a combination of logic gates, a system-on-chip, a microprocessor, or another type of processing or control circuit.

Accordingly, in accordance with one embodiment, an apparatus first logic to generate a first data voltage corresponding to a first grayscale value and a second data voltage corresponding to a second grayscale value lower than the first grayscale value based on a reference voltage; and second logic to generate a third data voltage corresponding to a third grayscale value lower than the second grayscale value based on a voltage level difference between the first data voltage and the second data voltage.

The second logic may include a first calculator to calculate the voltage level difference based on the first data voltage and the second data voltage; a second calculator to calculate a voltage variation based on the voltage level difference from the first calculator; and a third calculator to calculate the third data voltage based on the voltage variation from the second calculator and the second data voltage, wherein the third data voltage is based on one of a sum of or a difference between the second data voltage and the voltage variation.

When implemented in at least partially in software, the generators, calculators, selectors, drivers, and other processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

In accordance with one or more of the aforementioned embodiments, a data driving unit and a data voltage setting method compares two different data voltages which are adjusted by the optical measurement and adjusts the grayscale value which corresponds to a very low brightness.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the embodiments set forth in the claims.

What is claimed is:

1. A display device, comprising:

a panel comprising pixels; and a data driver to supply a first data voltage corresponding to a first grayscale value, a second data voltage corresponding to a second grayscale value lower than the first grayscale value, and a third data voltage corresponding to a third grayscale value lower than the second grayscale value, to the pixels, wherein the third data voltage is based on a sum of a voltage variation and the second data voltage, and wherein when a voltage level difference between the first data voltage and the second data voltage is greater than a first reference voltage level difference and less than a second reference voltage level difference, a value of the voltage variation is greater than when the difference between the first data voltage and the second data voltage is less than the first reference voltage level difference, and is less than when the difference between the first data voltage and the second data voltage is greater than the second reference voltage level difference.

2. The display device as claimed in claim 1, wherein the data driver comprises:

a first and second data voltage generator to generate the first data voltage and the second data voltage; and a third data voltage generator to generate the third data voltage based on the voltage variation and the voltage level difference between the first data voltage and the second data voltage.

3. The display device as claimed in claim 2, wherein the third data voltage generator comprises:

a first calculator to calculate the voltage level difference based on the first data voltage and the second data voltage from the first and second data voltage generator;

a second calculator to calculate the voltage variation based on the voltage level difference from the first calculator; and a third calculator to calculate the third data voltage based on the voltage variation from the second calculator and the second data voltage from the first and second data voltage generator.

4. The display device as claimed in claim 3, wherein the pixels comprise a first pixel to emit light of a first wavelength, a second pixel to emit light of a second wavelength shorter than the first wavelength, and a third pixel to emit light of a third wavelength shorter than the second wavelength, and wherein each of the first and second data voltages comprises a first sub data voltage corresponding to the first pixel, a second sub data voltage corresponding to the second pixel, and a third sub data voltage corresponding to the third pixel.

5. The display device as claimed in claim 4, wherein the second calculator is to store the first reference voltage level difference and the second reference voltage level difference that is greater than the first reference voltage level difference.

6. The display device as claimed in claim 3, wherein:

the first calculator comprises a calculation amplifier and first, second, third, fourth and fifth resistors, the calculation amplifier comprising an inverting input terminal, a non-inverting input terminal, and an output terminal;

a first end of the first resistor is electrically connected to the inverting input terminal, and the first data voltage is to be supplied to a second end of the first resistor;

the second resistor is electrically connected between the inverting input terminal and the output terminal;

a first end of the third resistor is electrically connected to the non-inverting input terminal and the second data voltage is to be supplied to a second end of the third resistor;

the fourth resistor is electrically connected between the non-inverting input terminal and a ground; and the fifth resistor is electrically connected between the output terminal and the ground.

7. The display device as claimed in claim 3, wherein:

the third calculator comprises a calculation amplifier and sixth, seventh, eighth, ninth and tenth resistors, the calculation amplifier comprising an inverting input terminal, a non-inverting input terminal, and an output terminal;

the sixth resistor is electrically connected between the inverting input terminal and a ground;

the seventh resistor is electrically connected between the inverting input terminal and the output terminal;

a first end of the eighth resistor is electrically connected to the non-inverting input terminal, and the second data voltage is to be supplied to a second end of the eighth resistor;

a first end of the ninth resistor is electrically connected to the non-inverting input terminal, and the voltage variation is to be supplied to a second end of the ninth resistor; and the tenth resistor is electrically connected between the output terminal and the ground.

8. A method for controlling a display device, the method comprising:

correcting a first data voltage corresponding to a first grayscale value and a second data voltage corresponding to a second grayscale value lower than the first grayscale value by optical measurement; and supplying a third data voltage corresponding to a third grayscale value lower than the second grayscale value, the third date voltage being based on a sum of a voltage variation and the second data voltage, to pixels, wherein when a voltage level difference between the first data voltage and the second data voltage is greater than a first reference voltage level difference and less than a second reference voltage level difference, a value of the voltage variation is greater than when the difference between the first data voltage and the second data voltage is less than the first reference voltage level difference, and is less than when the difference between the first data voltage and the second data voltage is greater than the second reference voltage level difference.

9. The method as claimed in claim 8, wherein the supplying the third data voltage comprises:

calculating a difference between the first and second data voltages and generating the voltage level difference;

generating the voltage variation based on a comparison of the voltage level difference with the first reference voltage level difference and the second reference voltage level difference; and generating the third data voltage by calculating a difference between the second data voltage and the voltage variation.

10. The method as claimed in claim 9, wherein the pixels comprise a first pixel to emit light of a first wavelength, a second pixel to emit light of a second wavelength that is shorter than the first wavelength, and a third pixel to emit light of a third wavelength that is shorter than the second wavelength, and wherein each of the first and second data voltages comprises a first sub data voltage corresponding to the first pixel, a second sub data voltage corresponding to the second pixel, and a third sub data voltage corresponding to the third pixel.

* * * * *